Figure 1:
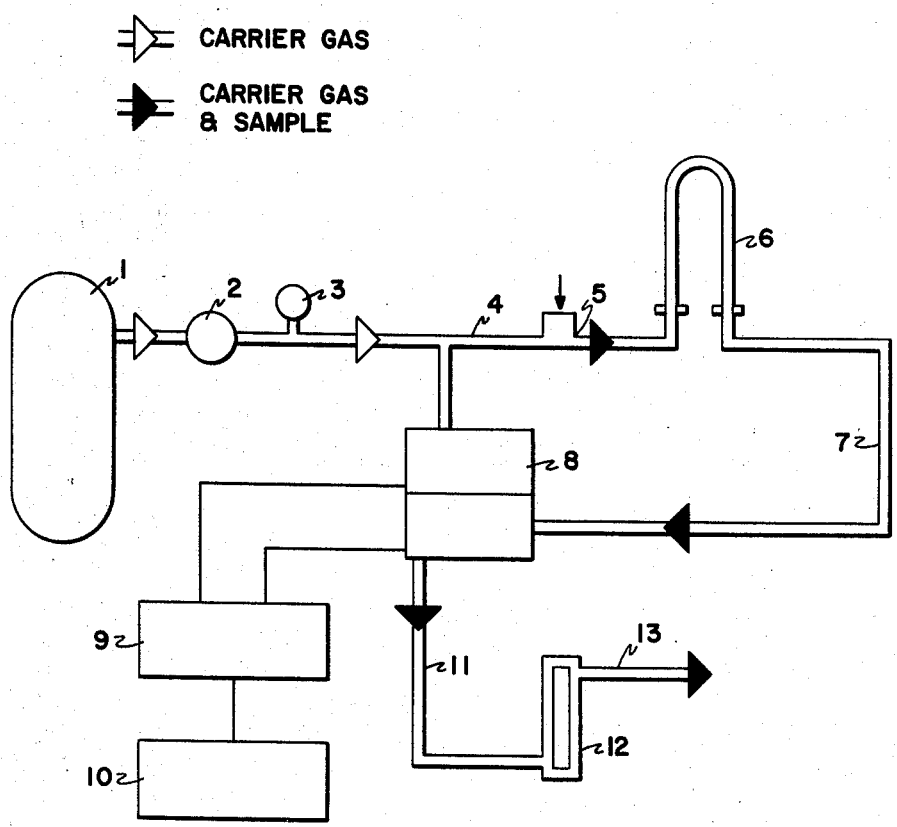

July 5, 1960

B. E. HUDSON, JR., ET AL 2,943,702

GAS CHROMATOGRAPHY

Filed May 17, 1957

4 Sheets-Sheet 1

Boyd E. Hudson, Jr.
Arthur E. Messner   Inventors

By *Seymour Stahl* Attorney

July 5, 1960 B. E. HUDSON, JR., ET AL 2,943,702
GAS CHROMATOGRAPHY
Filed May 17, 1957 4 Sheets-Sheet 4

RETENTION VOLUME AS A FUNCTION OF BOILING POINT
(GLYCEROL COLUMN AT 80°C.)

Boyd E. Hudson, Jr.
Arthur E. Messner  Inventors

By *Seymour Stoll* Attorney 2,943,702
Patented July 5, 1960

2,943,702
GAS CHROMATOGRAPHY

Boyd E. Hudson, Jr., Cranford, and Arthur E. Messner, Roselle Park, N.J., assignors to Esso Research and Engineering Company, a corporation of Delaware Filed May 17, 1957, Ser. No. 659,786

8 Claims. (Cl. 183—115)

This invention relates to the separation of gases by an improved gas chromatographic procedure. More specifically this invention comprises the separation of volatile compounds, especially oxygenated compounds by gas chromatography employing novel substrates in liquid partition columns. Still more specifically this invention comprises the separation of oxygenated compounds by gas chromatography employing organic polyhydroxy hydrocarbon compounds containing at least one hydroxyl group per three carbon atoms and being substantially non-volatile.

Basically gas chromatography involves the separation of compounds in vapor phase by selective adsorption of the components from a sample on a solid adsorbent or in a liquid absorbent. The present invention relates to partition columns which contain generally a liquid absorbent or substrate carried on a porous inert solid base. Chromatography within the last few years has been found to be a powerful analytical tool for accurate analysis and is especially applicable to plant as well as laboratory use wherein very minute amounts of contaminants generally go undetected or effect confusion in conventional spectrochemical analyses.

This invention relates specifically to the elution technique of gas analysis wherein the sample is introduced into a column of selective liquid absorbent held in a film on a base with an inlet stripping gas or carrier and passed through the column at a regulated flow rate, pressure and temperature. The substrate in the column retains the individual components for specific time periods depending on the affinity of the substrate for the specific components within the gas mixture to be analyzed. Components of the sample travel through the column at different relative speeds depending on this affinity. Accordingly the outlet gas or eluent will comprise the inert carrier gas and the separated components which exit the column sequentially in the order of their respective speeds through the column. This process is obviously amenable to the continuous recordation of contaminants within a gaseous stream. This process is equally adaptable to the isolation and recovery of individual components which may be trapped in separate vessels after exiting the column. Gas chromatography while especially amenable to plant use for on the spot analysis which may be coupled with automatic control devices is equally adaptable to the separation of contaminants in minor amounts in the production of high purity commercial chemicals.

Two basic processes of gas chromatography are (1) vapor-solid adsorption where the gases are adsorbed on an active solid adsorbent which has defined affinities for the particular components of a gaseous stream, and (2) gas-liquid partition or substrate gas chromatography which relies on the use of a non-volatile liquid absorbent held on an inert solid, said substrate having defined affinities for the various components of any given gaseous stream. This invention deals with the latter technique.

In order to propel the sample gas through absorption column and to effect the stripping necessary, an inert carrier gas must be employed. Generally, the carrier gas is selected on the basis of having a high thermal conductivity so that detection sensitivity is increased. With low carrier gas flow rates it is desirable that the carrier gas have a low diffusion rate to avoid a decrease in column resolution at these low flow rates. The carrier gas must be inert insofar as the partition column and contents thereof are concerned. In the interest of safety it is preferably to employ gases which will not form explosive mixtures with air or other components of the gaseous stream. Some of the typical carrier gases which may be employed include helium, nitrogen, argon, air, methane, carbon dioxide and hydrogen. If hydrogen is employed, every safety precaution should be exercised because of the explosion hazard involved.

As the inert solid, any porous solid which will not react or in itself selectively adsorb the constituents of the gaseous mixture may be employed. Typical of porous inert solids which may be used as carriers for the substrate are kieselguhr, fire brick and the like. Particle size of the carrier is important only insofar as it effects the pressure drop in the adsorption column. While decreasing the particle size effects generally increased resolution probably due to the greater surface area of the substrate, with a decrease in size below about 80 to 100 mesh the increased resolution is offset by the high pressure drop which ensues causing a carrier gas velocity gradient over the column length thereby precluding the optimization of the carrier gas flow rate. As previously noted, the substrate is employed as a thin film on the carrier, generally in a weight ratio of substrate to carrier of 0.05 to 0.5:1. The particular means of obtaining this thin film is not critical. However one preferred method comprises employing the substrate in a volatile solvent, saturating the inert porous carrier with the solvent-substrate mixture and thereafter air drying the impregnated solid to remove the volatile solvent. Insofar as the substrate or partition liquid is concerned it must be non-volatile so that it remains on the carrier throughout the analysis or separation.

As the individual constituents become separated and emerge sequentially with carrier gas from the absorption column, the gas may be directed into any conventional detecting system which responds quantitatively to the presence of vaporous constituents other than the carrier gas itself. One of the more popular detecting systems comprises a differential thermal-conductivity cell.

Such a cell comprises two chambers, one of which ("reference" cell) communicates to a stream of the carrier gas alone, unlike the second ("sample" cell) which is continuously purged by the gas or gases emerging from the chromatographic column. Both cells contain electrically heated thermo-sensitive elements which may consist simply of coiled metal wire filaments, or beads of semi-conductive material electrically connected to and supported by very thin metal wires. The thermo-sensitive elements are connected externally with auxiliary resistive elements in the manner of a Wheatstone bridge, with at least one adjustable resistive device for electrical balancing. When the same gas permeates both cells and the bridge is adjusted to the null point, any change in composition of the gas flowing through the "sample" cell is made manifest by the development of an imbalance of the bridge circuit and the appearance of an electrical signal at the output terminals of the detector bridge. The output signal may operate a sensitive indicating meter or any of several types of recording devices. Detectors other than the thermal-conductivity type may be employed.

Since the particular detection system does not relate in any way to the heart of the present invention a full description thereof is unnecessary. However for the sake of completing the disclosure reference may be had to a typical detection system which is completely and specifically described in assignee's copending application, Serial No. 525,688.

The substrate of this invention may comprise any non-volatile hydrocarbon compound containing as functional groups two or more hydroxyl radicals wherein the ratio of carbon atoms to hydroxyl is no greater than 3:1. These non-volatile polyhydroxy compounds are represented by glycerol, diglycerol, 1,1,1-trimethylol propane, ethylene glycol, propylene glycol-1,2 or 1,3, butylene glycol-1,2 or 1,3, pentane diols and hexane diols, and will vary in molecular weight between 62 and 182.

Outstanding results have been obtained with glycerol. Beside effecting clean separations between oxygenated compounds such as carbonyls, ketones, ethers, esters and alcohols the substrates of this invention have a very low affinity for paraffins, lower olefins and low molecular weight aromatics such as benzene and toluene. These substrates therefore afford a method of separating and/or detecting small amounts of hydrocarbon in oxygenated products such as alcohols and carbonyls. Another surprising factor is the ability of the substrates of this invention to make a clean separation between primary, secondary and tertiary alcohols.

To define with more particularity the present invention reference is had to Figure 1 which represents a schematic diagram showing a chromatographic instrument applicable to the present process. In Figure 1, 1 represents the storage tank for the inert carrier gas such as those described heretofore. The carrier gas is passed first through a gas regulator 2 where the pressure is regulated generally between 0 to 50 p.s.i.g. A pressure gauge 3 is preferably employed downstream from the gas regulator. The carrier gas is passed along via line 4. The mixture to be analyzed or separated into individual components is measured if desired and injected into the flowing carrier gas near the column inlet at point 5 and is vaporized rapidly. The point of sample entry may of course vary depending on the particular apparatus employed. The amount of sample gas employed is dependent principally on the size of the column and may vary considerably. Column 6 comprises packing of kieselguhr (not shown) of from 40 to 150 mesh particle size carrying a thin film of the substrate of this invention. The column may be of any conventional design adaptable to gas chromatography. As the carrier gas and the sample move through the column 6 the substrate selectively retains the various components of the sample and these individual components accordingly move through the column at different speeds depending on their relative retention by the substrate. Temperatures within the system may be maintained between the freezing point of the substrate and 150° C. and pressures between 0 to 50 p.s.i.g. At a given temperature of operation and gas flow rate each component will therefore appear at the column exit at a definite time which is characteristic of that component's affinity for the particular column material. The eluent comprising a carrier gas and the separated components pass via line 7 to a thermal-conductivity cell 8 such as that defined above having attached thereto detector circuits 9 measuring by heat difference the flow of the individual components of the sample mixture. Recorder 10 may be a device which sets forth the results in the form of peaks on a graph, referred to herein as chromatogram. The area within the peak becomes a measure of concentration. Eluent comprising carrier gas and sequentially the separated components flows via line 11 through flow meter 12 and line 13 to any conventional type of collecting system if desired. The coordinates of chromatogram are time and detector response, i.e., the height of the peaks. The time required to reach the height of the peak or point of maximum concentration of a component at the detector after passing through a specific column is all that is necessary for identification.

Generally a small amount of air or a second inert gas is initially fed into the columns with the sample, thus creating a difference in thermal conductivity. The time required to reach the height of the peaks with regard to the components of the gas sample is measured from the time the second inert gas is recorded. The lapse of time indicates the dead volume in the column. This is true, provided both temperature and gas flow rate are held constant for a given column. Since it is difficult, however, to reproduce exactly a specific flow rate from day to day, it is convenient to multiply the retention time by the flow rate to obtain a retention volumn, $V_r$. This affords a method of eliminating flow rate as a consideration when comparisons are made for a given column at a given temperature. The following equation summarizes this:

$$(V_r)_T = (t_0 - t_{air})F = t_r F$$

where $V_r$ = retention volume
$t_0$ = time elapsed between sample injection and component detection minutes
$t_{air}$ = time elapsed between sample injection and carrier gas detection (related to dead volume)
$t_r$ = retention time, min.
$F$ = flow rate, ml./min.
$T$ = given temperature Another procedure is to express peak locations for components for a given column of material in terms of retention ratios, for example, the ratio of retention time of a component to that of an internal standard. This eliminates all of the experimental factors simultaneously except for temperature so that comparisons can be made without requiring measurements of the flow rate.

Figure 2:
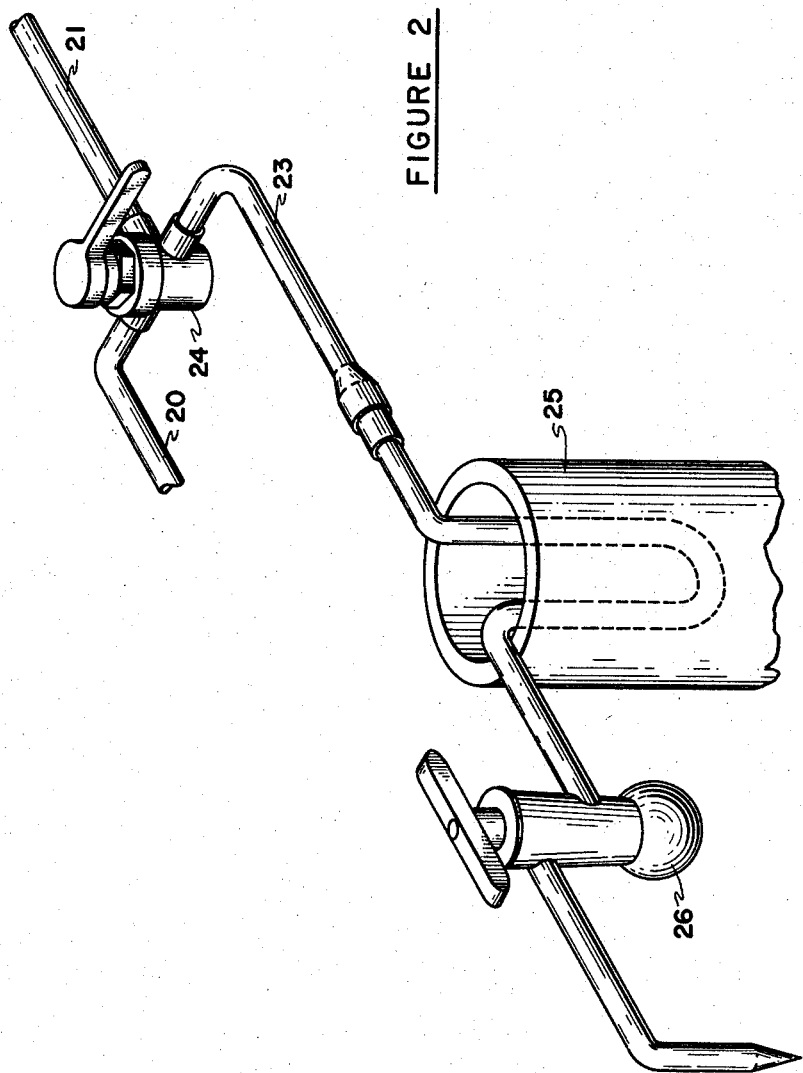

One means for collecting the individual fractions comprises taking the gaseous flow from line 13 and passing it through a collecting system shown in Figure 2. The collecting system consists of tubing 20, branching into two exits 21 and 23, through a three-way stopcock 24. The exit arms then may feed into a U or other type condenser trap 25 wherein the separated components are condensed and collected. Thermocouples may be placed in the exit arms to enable monitoring of the manifold temperature. Each trap preferably embodies a high vacuum stopcock 26, the exit tube from said stopcock being adaptable for plugging into a mass spectrometer or other analytical device.

In the operation of the process forerunnings are diverted through one of the exit arms 21. When the desired chromatographic peak begins to appear at the recorder the exit stream is switched manually or automatically to the other arm with the trap in position. Succeeding fractions representing individual components may be caught by additional traps branching off on 23 having the necessary stopcock apparatus. The traps may be cooled to condense substances boiling below about 300° F. The filled traps are then capped, chilled by any means such as in liquid nitrogen and pumped free of gas. Thus the amount of contaminant can readily be determined for any given gas sample and a good separation equivalent to distillation with approximately 1 000 theoretical plates can be obtained. If desired, the separated component may then be analyzed by any appropriate means. To illustrate the unique characteristics of the polyhydroxy organic hydrocarbon compound substrates of this invention, diethyl ether, acetone and ethanol were passed through the gas chromatographic analyzer with the results shown in the following example:

EXAMPLE I

Temperature, 80° C.
Support, firebrick, 40–80 mesh
Substrate, glycerol, 40 gms. glycerol/100 gms. firebrick
Column diameter ¼"; length 40"
Helium carrier; inlet pressure 0.1–2:0 p.s.i.g.

*Comparative selectivity [1] of various substrates for ethanol and for acetone relative to diethyl ether*

| Substrate | Acetone, B.P., 56° C. | Ethanol, B.P., 78° C. |
|---|---|---|
| Paraffinic Oil | 0.72 | 1.14 |
| Silicone Oil | 1.7 | 0.85 |
| Dioctyl Phthalate | 1.6 | 1.4 |
| Dinonyl Phthalate | 1.8 | 1.75 |
| Tricresyl Phosphate | 2.85 | 3.6 |
| Glycerol | 29 | 150 |

[1] Based on retention volume where diethyl ether=1.

The above data clearly show that with other substrates a good separation between ethanol, ether and acetone could not be made readily and without resort to extremely long columns.

The glycerol which is the preferred substrate of this invention effected a selectivity with regard to ketone-ether ten times greater than tricresyl phosphate substrate which in turn was far superior to the other substrates employed. With regard to the alcohol-ether selectivity glycerol effected a forty times greater selectivity than the tricresyl phosphate. On the basis of the above run the selectivity for ethanol relative to acetone was as follows:

TABLE.—SELECTIVITY FOR ETHANOL RELATIVE TO ACETONE
[Retention volume of acetone=1.0]

Paraffin, silicone and phthalates _____ 0.5–2.0
Tricresyl phosphate _____ 1.25
Glycerol _____ 5.3

Figure 3:
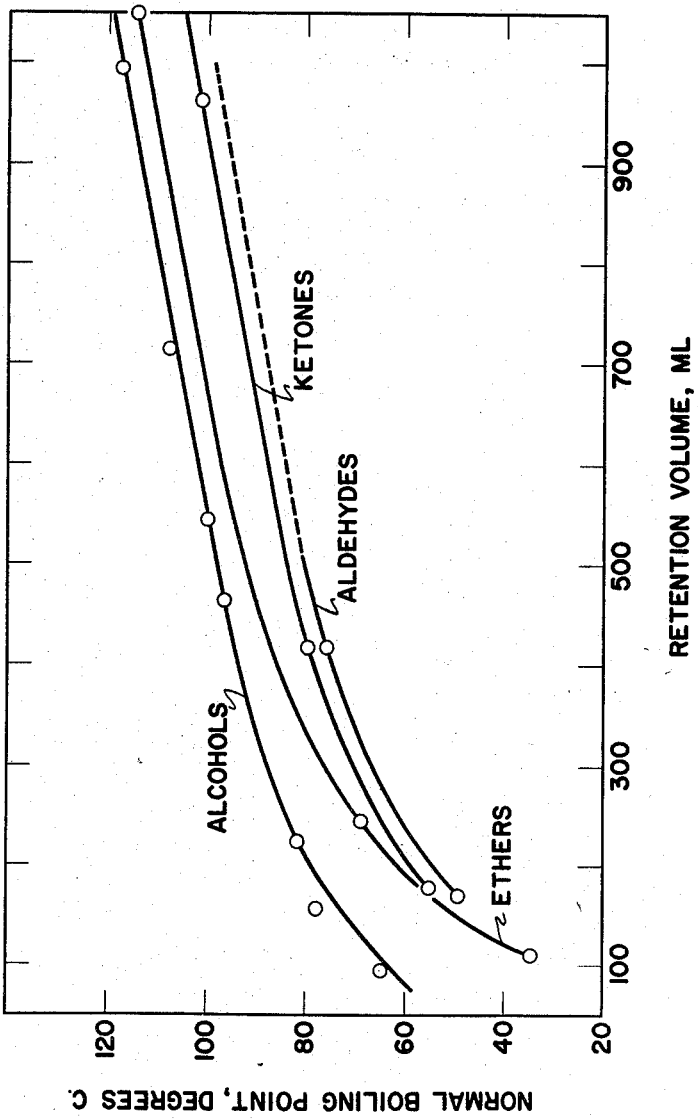

To further illustrate the unusual properties of glycerol and the like substrates, ethers, carbonyls and alcohols were analyzed, and retention time was plotted against normal boiling points of the various components. Figure 3 (Example II) shows this analysis employing dioctyl phthalate and Figure 4 (Example III), glycerol. The conditions employed were the same as those in Example I with exception of the particular substrate. In Figure 3 the alcohols were not separated according to type whereas in Figure 4 clean accurate separations were made between the primary, secondary and tertiary alcohols. Also in Figure 3 a clean separation between isopropyl alcohol, isopropyl ether and methyl ethyl ketone all boiling close to 80° C. could not be made employing a column of moderate length. It will be noted in Figure 3 that close boiling components of different classes, e.g. alcohols, aldehydes, etc., have the same retention volume and would exit the column at approximately the same time.

Figure 4:
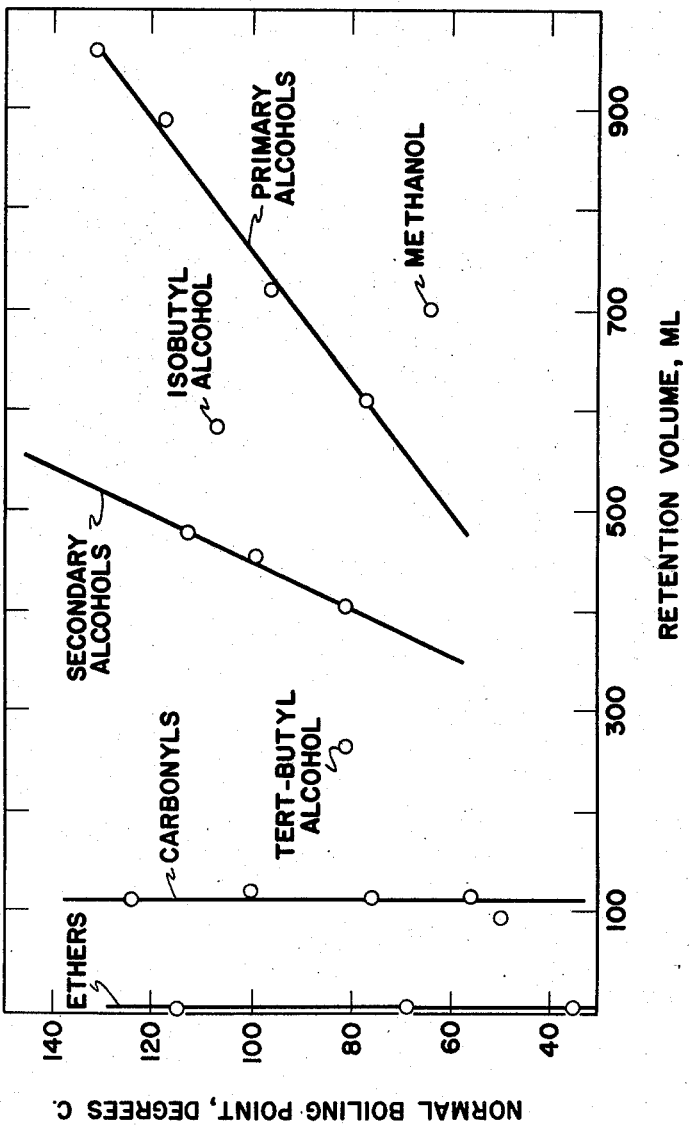

In the case of the ethers where all of them pass through the column at the same rate of speed the mixture of ethers may be further analyzed by fractionation or any other procedure which will separate the components in accordance with their respective boiling points. For example, the chart in Figure 4 shows the separation of three ethers from the complex mixture. These ethers are diethyl, B.P. 35° C.; diisopropyl, 69° C.; and butyl ether, 115° C.

EXAMPLE IV

In another series of runs the conditions of Example I were duplicated employing 1,1,1-trimethylol propane as the substrate. The retention ratios of acetone-diethyl ether-isopropyl alcohol were found to be 0.39:0.16:1.00, which were good but not quite as definitive as those with glycerol, i.e., 0.30:0.03:1.00. Isopropyl alcohol was arbitrarily rated as 1.00.

What is claimed is:

1. A method of separating oxygenated compounds from a mixture containing at least 2 volatile oxygenated organic compounds selected from the group consisting of ethers, carbonyls, primary, secondary and tertiary alcohols which comprises passing said mixture in a vapor phase with an inert carrier gas through a liquid partition zone containing a substrate comprising a film of a liquid non-volatile organic polyhydroxy compound, containing at least 1 hydroxyl group per 3 carbon atoms and having a molecular weight between 62 and 182, supported on a finely divided porous inert carrier at a temperature between the freezing point of the substrate and 150° C. at an inlet pressure of 0 to 50 p.s.i.g., whereby said substrate retains the individual oxygenated components of said mixture for different periods of time and whereby said components emerge sequentially in the following order: ethers, carbonyls, tertiary alcohols, secondary alcohols and primary alcohols.

2. A method in accordance with claim 1 wherein said substrate comprises glycerol.

3. A method in accordance with claim 1 wherein said substrate comprises 1,1,1-trimethylol propane.

4. A method in accordance with claim 1 wherein said substrate comprises diglycerol.

5. A method of separating volatile ethers, carbonyls, primary, secondary and tertiary alcohols that have boiling points below about 150° C. from a mixture containing them which comprises passing said mixture in vapor phase with an inert carrier gas through a liquid partition zone containing a substrate comprising a film of a liquid non-volatile organic polyhydroxy compound, selected from the group consisting of glycerol and diglycerol, supported on a finely divided porous inert carrier at a temperature between the freezing point of the substrate and 150° C. at an inlet pressure of 0 to 50 p.s.i.g., whereby said substrate retains the individual components of said mixture for different periods of time and whereby said components emerge sequentially in the following order: ethers, carbonyls, tertiary alcohols, secondary alcohols and primary alcohols.

6. A method in accordance with claim 5 wherein said substrate comprises glycerol.

7. A method of separating primary, secondary and tertiary alcohols from a mixture containing said alcohols which comprises passing said mixture in a vapor phase with an inert carrier gas through a liquid partition zone containing a substrate comprising a film of a liquid non-volatile organic polyhydroxy compound, selected from the group consisting of glycerol and diglycerol, supported on a finely divided porous inert carrier at a temperature between the freezing point of the substrate and 150° C. at an inlet pressure of 0 to 50 p.s.i.g. whereby said substrate retains the individual alcohol components of said mixture for different periods of time and whereby said alcohol components emerge sequentially in the following order: tertiary alcohols, secondary alcohols and primary alcohols.

8. A method in accordance with claim 7 wherein said substrate comprises glycerol.

References Cited in the file of this patent

"Gas Chromatography Growing," Chemical and Engineering News, April 9, 1956, pages 1692–1696.